US007093250B1

(12) United States Patent
Rector

(10) Patent No.: US 7,093,250 B1
(45) Date of Patent: Aug. 15, 2006

(54) PRIORITY SCHEDULER FOR DATABASE ACCESS

(75) Inventor: Kenneth D. Rector, Woodland Hills, CA (US)

(73) Assignee: NCR Corporation, Dayton, OH (US)

( * ) Notice: Subject to any disclaimer, the term of this patent is extended or adjusted under 35 U.S.C. 154(b) by 782 days.

(21) Appl. No.: 09/975,399

(22) Filed: Oct. 11, 2001

(51) Int. Cl.
G06F 9/46 (2006.01)
G06F 7/00 (2006.01)

(52) U.S. Cl. .......................... 718/100; 718/103; 707/1

(58) Field of Classification Search .................. 718/1, 718/100–108; 707/1–10

See application file for complete search history.

(56) References Cited

U.S. PATENT DOCUMENTS

2002/0064149 A1* 5/2002 Elliott et al. ................ 370/352

* cited by examiner

Primary Examiner—Meng-Ai An
Assistant Examiner—Kenneth Tang
(74) Attorney, Agent, or Firm—Baker Botts; Steve Stevens

(57) ABSTRACT

A method for scheduling access to resources of a database is disclosed. Users logon to initiate database sessions. Commands received from a database sessions cause tasks to be initiated. Each task is classified in one of a first set of groups based at least in part on one or more logon account attributes associated with the session that initiated the task. A weight is assigned to each group of the first set of groups. Each task is classified in one of a second set of groups. Each group in the second set of groups is assigned a weight. Each task's access to processor resources of the database is limited based at least in part on the weight of the group from the first set in which that task is classified and also based at least in part on the weight of the group from the second set in which that task is classified.

21 Claims, 7 Drawing Sheets

| PG | PRI | PP TYPE | LIMIT, AG |
|---|---|---|---|
| L | 0 | Resource Use | 0, 1 |
| low$ | 1 | Resource Use | 0, 1 |
| M | 2 | Resource Use | 0, 2 |
| med$ | 3 | Resource Use | 0, 2 |
| H | 4 | Resource Use | 0, 3 |
| high$ | 5 | Resource Use | 0, 3 |
| R | 6 | Resource Use | 0, 4 |
| rush$ | 7 | Resource Use | 0, 4 |

— 610

| AG | WEIGHT | RELATIVE WEIGHT |
|---|---|---|
| 1 | 5 | 5/75 |
| 2 | 10 | 10/75 |
| 3 | 20 | 20/75 |
| 4 | 40 | 40/75 |

PRIORITY SCHEDULER FOR DATABASE ACCESS

BACKGROUND

Establishing priority among different users is important in relational database systems that deal with complex queries made by many users simultaneously against large volumes of data. Different users can tie up various resources of the database system for long periods of time if the level of resource usage is not controlled. The productivity of users whose activities depend upon information in the database system can be adversely impacted if other users are monopolizing the resources even though the information being retrieved by their queries is not immediately necessary.

Constraints on both processing resources and input/output resources can limit the ability of a database system to respond to queries by users. A large number of system administrators would be necessary to monitor and change the resource allocations for all the tasks initiated by users. For some systems, many thousands of users can have active database system sessions simultaneously. Large databases can experience problems related to the user workload which are site specific and require careful analysis and fine tuning. Those problems can also directly affect the system's performance and usability. Database users, their support engineers, database administrators and developers desire to have some way to gather information and diagnose workload-related problems so that recommendations for tuning and task prioritization can be made.

Existing techniques for controlling use of resources include rigid limits based on the group membership of the user. Such techniques are configured by modifying the group membership or changing the rigid limits that apply to the group.

SUMMARY

In general, in one aspect, the invention features a method for scheduling access to resources of a database. Users logon to initiate database sessions. Commands received from a database sessions cause tasks to be initiated. Each task is classified in one of a first set of groups based at least in part on one or more logon account attributes associated with the session that initiated the task. A weight is assigned to each group of the first set of groups. Each task is classified in one of a second set of groups. Each group in the second set of groups is assigned a weight. Each task's access to processor resources of the database is limited based at least in part on the weight of the group from the first set in which that task is classified and also based at least in part on the weight of the group from the second set in which that task is classified.

In another aspect, the invention features a scheduled resource access database system. The system includes one or more nodes and a plurality of CPUs, each of the one or more nodes providing access to one or more CPUs. The system also includes a plurality of virtual processes, each of the one or more CPUs providing access to one or more virtual processes. Each virtual process is configured to manage data stored in one of a plurality of data-storage facilities. A priority scheduler component is configurable to control access to the virtual processes by sessions of the database system. The priority scheduler component is also configurable to classify tasks initiated by sessions in at least two different groups at the same time and limit access to the virtual processes by each task based at least in part on the two groups in which that task in classified Other features and advantages will become apparent from the description and claims that follow.

BRIEF DESCRIPTION OF THE DRAWINGS

FIG. 6 is a graph of resource access over time.

DETAILED DESCRIPTION

Figure 1:
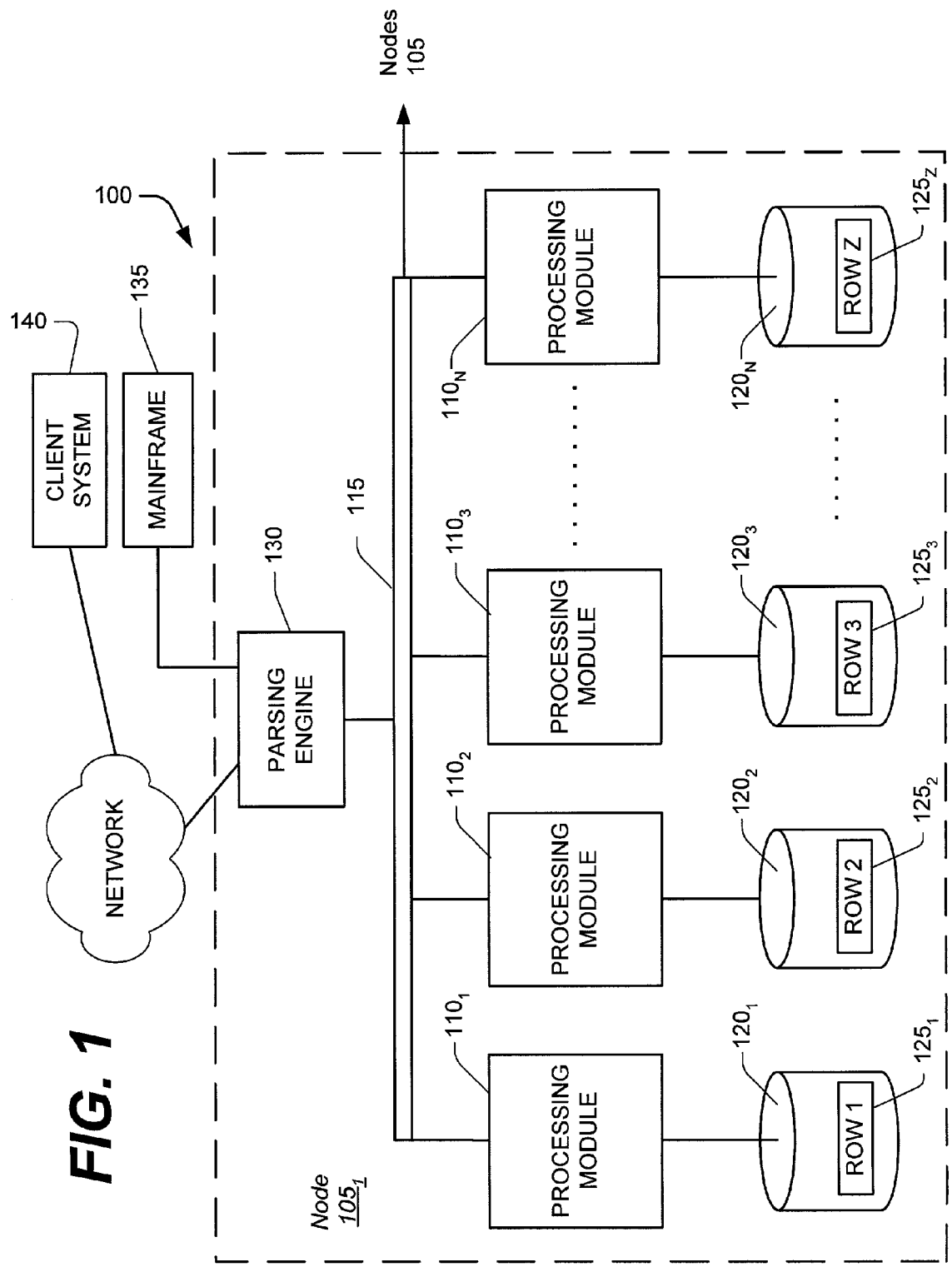
FIG. 1 is a block diagram of a node of a database system.

The priority scheduler technique and system disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors. In one implementation, the priority scheduler technique and system disclosed herein works independently on each node $105_n$ of a DBS 100 having many nodes $105_{1...N}$ by controlling access to CPU resources for the sessions running on each node $105_n$. Each node $105_n$ in a DBS 100 can support a unique mix of sessions and the scheduler balances the resource allocation for those sessions. In this implementation, the scheduler does not attempt to perform inter-node resource management. Other implementations do include inter-node resource management.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

The rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated as a hash bucket. The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
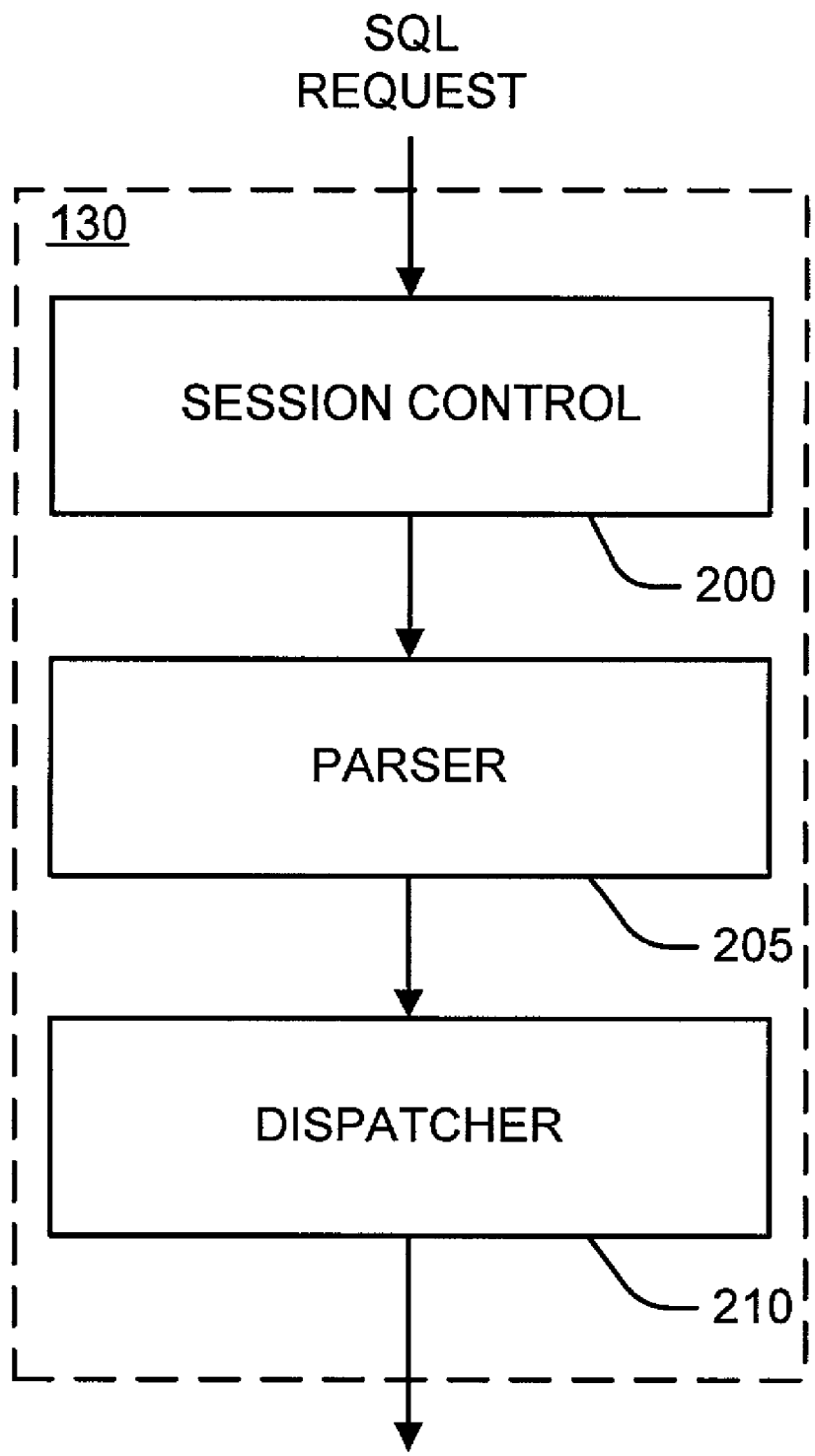
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access. The session control 200 also controls the level of resource usage for sessions that result from logon operations. Session control 200 is more particularly described with reference to FIG. 4. The parser 205 receives user queries and determines the most efficient sequence of processing module commands for carrying out those queries. The processing module commands are then passed to the dispatcher 210 which communicates with the processing modules $110_{1 \ldots N}$ by means of the network 115. Performing the commands requires both processing resources and input/output resources.

Figure 3:
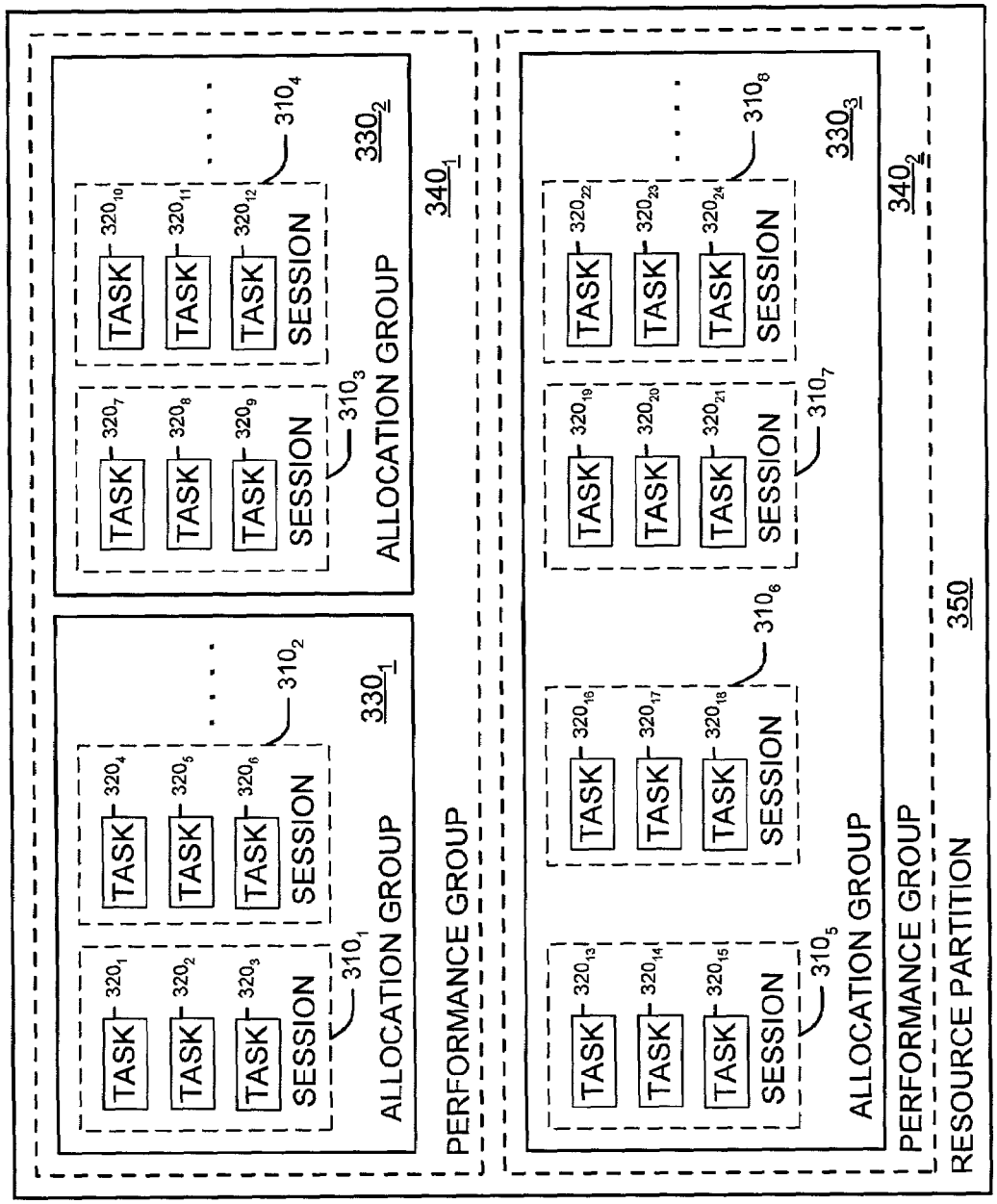
FIG. 3 is a data structure of a resource partition.

In one implementation, the priority scheduler technique and system forms a hierarchical control structure to group sessions for scheduling purposes. That implementation includes three levels of control structures: the resource partition, the performance group and the allocation group. Each level includes parameters that relate them to each other and define the scheduling environment. FIG. 3 illustrates a data structure of a resource partition 350. As each user logs into the DBS 100, sessions $310_{1-8}$ are initiated to administer DBS 100 activities on behalf of each user. Tasks $320_{1-24}$ are initiated, some by user commands, and run on the DBS 100 until completed. Each task 320 can make use of both processor resources and I/O resources. In one implementation, the tasks $320_{1-24}$ are grouped into performance groups $340_{1-2}$ according to the sessions $310_{1-8}$ with which they correspond. In another implementation, the tasks $320_{1-24}$ are assigned to performance groups $340_{1-2}$ as they are initiated. A third implementation assigns some tasks according to initiating session and other tasks according to the characteristics of the task.

Each of the performance groups $340_{1-2}$ includes rules for assigning tasks assigned to that performance group to one or more allocation groups $330_{1-3}$. The first performance group $340_1$ shows its tasks separated between two allocation groups $330_{1-2}$. All the tasks of the second performance group $340_2$ are assigned to a single allocation group $330_3$. While tasks for a particular session are all shown to be assigned to one allocation group, that is not required. If two tasks from one session are assigned to different allocation groups by the rules of their performance group, they will receive resources in accordance with that assignment. In addition, different performance groups can assign tasks to the same allocation group. In one implementation, allocation groups are unique to resource partitions such that performance groups from different resource partitions cannot assign tasks to the same allocation group.

Both the resource partition 350 and the allocation groups $330_{1-3}$ are relevant in determining the amount of resources that a task will receive. In one implementation, each resource partition and each allocation group has a weight. The ratio of a resource partition's weight to the total weight for all resource partitions is part of a calculation of the resources that can be used by tasks in the resource partition. A resource partition weight is a unit-less value. For example, if two resource partitions have weights of 10 and 25, the former is entitled to 10/35, or 28.5%, and the later is entitled to 25/35, or 71.5%, of the total resources. Resource partition weight may also be used to express the resource ratio between two resource partitions. In this case, the latter is eligible for 25/10, or 2.5 times, the resources of the former. Similarly, the ratio of an allocation group's weight to the total weight for all allocation groups is part of a calculation of the resources that can be used by tasks in that allocation group. Resource allocation is based at least in part on those two levels of weighting.

In one implementation, the resource allocation also responds to actual use of resources by the tasks within resource partitions and allocation groups. If the tasks assigned to a resource partition are unable to consume the partition's entire share of resources, the unconsumed portion will be distributed to other resource partitions according to their weights. For example, three resource partitions with weights of 10, 10, and 15 contain all active tasks. If the first partition only uses 2/35 of the resources, the other two partitions would divide the remaining 33/35 in the ratio of 10 to 15. The second would receive 10/25*33/35=330/875 and the third would receive 15/25*33/35=495/875. All together the three partitions would share the resources in proportions of approximately 6%, 37% and 57%. The third partition would get 1.5 (10/15) times the resources of the second. The same type of reallocation can occur among allocation groups of a resource partition when there are unused resources.

In one implementation, the assignment of sessions to performance groups is accomplished during the logon process. The assignment may be made explicitly by including a performance group name in the logon accountid string that matches the name of one of the performance groups defined by the scheduler parameters. Thus, performance groups $340_{1-2}$ can each have a name. If a matching name is not found, or a performance group name is not included in the accountid string, or if the user is not authorized for that accountid, a default assignment can be made by the scheduler. The administrator matches user authorization accountid strings to scheduler performance group names when designing and implementing a scheduling strategy. A session's performance group assignment may be modified by commands invoked by utilities, for example BTEQ (a utility and command language) or Teradata Manager. The performance group to which a session is assigned determines the resource partition because each performance group is a member of a resource partition. For example, performance groups $340_{1-2}$ are members of the resource partition 350. Thus, in one implementation, a resource partition and its set of performance groups identify a group of users that are related by their account id strings The performance groups define how tasks are assigned to allocation groups according to any available task or system characteristics. In one implementation, a performance group defines from one to five performance periods. Each period has two attributes, an allocation group and a limit value. The type of performance period indicates what characteristic is compared to the limit value. If the comparison is a match, the task is assigned to the specified allocation group. Performance period type can be based on any task or system characteristic. As one example, performance periods can be based on the time of day, a system characteristic that is the same for all tasks. As another example, performance periods can be based on the recently used or currently used resources of a task, a characteristic that is different for different tasks. Performance groups with different types of performance periods may be combined within the same resource partition. In another implementation, performance periods may be defined by several different characteristics. As an example, tasks are assigned to allocation groups depending on their resource usage before noon, but are assigned to a different allocation group regardless of their resource usage after noon.

In one implementation, performance periods are based on session resource use. Tasks assigned to the performance group are therefore assigned to allocation groups based on the amount of resources consumed by their initiating session. As session resource consumption increases, tasks are assigned by successive periods within the performance group to successive allocation groups. Because tasks from several sessions with different amounts of session resource usage may be active in a performance group, several allocation groups can be controlling tasks at the same time within the same performance group. In an implementation where the priority scheduler technique and system work independently on each node $105_n$ of a DBS 100, the scheduler's notion of session resource consumption is relative to each node and may be quite different on different nodes and the scheduler will control tasks based on the activity on each node.

An allocation group can include a scheduling policy and a method of distributing resources to the tasks being controlled by the allocation group in addition to the allocation group's weight. A scheduling policy determines how the weight affects resource allocation. For example, the weight can be an absolute determination of the maximum resources to be used by the tasks. In another example, the weight determines the resource priority relative to the weights of other allocation groups.

When allocation group weight is a relative weight, it is relative to the weights of other allocation groups controlled by the resource partition and its performance groups. Its value, divided by the total allocation group weight of the resource partition, is the percentage of resources that can be allocated to the tasks controlled by the group. If those tasks cannot consume all of the possible resources, the unconsumed portion is distributed to the tasks assigned to the other allocation groups of the partition, according to their weights analogously to the method described above with respect to resource partitions.

To implement a scheduling policy, the scheduler's kernel procedures examine the recent CPU and I/O resource consumption of each task, and of all the tasks controlled by each allocation group. It combines these individual and group consumption rates according to the policy definitions described below and compares the result with a desired consumption rate established by the allocation group's weight. Based on the result of this comparison, the scheduler allows more or less access to system CPU and I/O resources by adjusting each task's operating system dependent dispatch priority. Dispatch priority determines the order of task execution in a multi-tasking operating system. Such multi-tasking operating systems include MP-RAS and Windows NT.

Tasks that have over-consumed resources and exceeded their desired consumption target are given a lower dispatch priority and must wait longer for CPU and I/O access. Tasks that have under consumed, and have not had adequate resource access to meet their target, are given a higher dispatch priority to gain quicker or more frequent access to the CPU and I/O subsystem. In one implementation, both CPU and I/O resources are considered in making this consumption comparison. In that implementation, a task that over consumes I/O resources is given a lower dispatch priority to both the CPU and I/O system.

In another implementation, access to device drivers by tasks is based on the resource partition and allocation group weights for the tasks requesting such access. When a queue develops for use of a device driver, the order of tasks in the queue is arranged to correspond to the product of each task's relative resource partition weight and relative allocation group weight.

One scheduling policy that can be used by allocation groups is the immediate policy. The immediate policy schedules each task controlled by the allocation group based on the resource consumption of all the tasks in the group. This policy does not consider the resource consumption of the individual task. This is similar to using the average consumption of all the tasks in the group and ignores the effect that tasks with abnormally high or low consumption might have. If the group resource consumption over a period of time is plotted, the curve would be smooth and correspond to the percentage defined by the allocation group weight. This policy will cause all tasks controlled by the allocation group to receive the same dispatch priority regardless of their individual resource use. Of course, that dispatch priority is determined by the resource consumption of all tasks assigned to the group and will vary as that consumption changes.

Another scheduling policy that can be used by allocation groups is the default policy. The default policy schedules each task of the allocation group based on both its own recent resource consumption and the consumption of all the tasks in the group. Each factor has equal weight. This policy considers task consumption as well as the average group consumption. A task that has lagged behind the others in the group for some reason is given an opportunity to catch up. Likewise, a task that has over-consumed resources is penalized, or denied resources, to get back in step with the group. A plot of resource consumption by an allocation group using this policy for a period of time would show a saw-tooth curve with spikes and dips when some tasks get more or less than the weight resource. The average value of the curve would parallel the allocation group weight. Scheduling policies with different weights of task and group resource usage are also possible implementations.

Another scheduling policy that can be used by allocation groups is the absolute policy. The absolute policy considers allocation group weight as an absolute percentage of all system resource. This is not a portion of the resource partition's resource, but a system wide percentage. The tasks controlled by this group are never allowed to consume more than this percentage value of resources. Even if excess resources are available, that is, if other groups are not running, these tasks cannot use them. This policy acts like the immediate policy to distribute resources to its tasks within the prescribed limit so that all tasks controlled by the group receive the same dispatch priority. To enforce this absolute percentage limit, tasks may be forced to sleep for short periods. These sleep periods are evenly distributed among the tasks being controlled.

Another scheduling policy that can be used by allocation groups is the relative policy. The relative policy is like the absolute policy with the allocation group weight interpreted as a relative weight. This relative weight may change based on the weights and activities of the other allocation groups, but it acts as a fixed limit to control resource allocation. This weight is relative to the total of the weights of other allocation groups in the resource partition that are active. That is, groups that have tasks assigned to them that are actually running. Thus, if there are no other active allocation groups in the resource partition, this relative weight will be 100%. The relative policy acts like the immediate policy to distribute resources to its tasks within the prescribed limit so that all tasks controlled by the group receive the same dispatch priority. To enforce this limit, tasks may be forced to sleep for short periods. These sleep periods are evenly distributed among the tasks being controlled. Many other scheduling policies reflecting combinations of the foregoing policies are possible implementations of the invention.

An allocation group can also have a set division type that specifies how the allocation group's resources are to be divided among the tasks controlled by the group. There many kinds of set division types. One type divides resources equally among all the tasks controlled by the allocation group. If there are two sessions controlled by an allocation group, and one starts a query involving all the processing modules $110_{1 \ldots N}$ and the other starts a query involving only one processing module $110_1$, resources will be divided equally between the tasks of both sessions. If there are four processing modules $110_{1 \ldots 4}$, one session will get ⅘ of the resources and the other session will get ⅕.

Another set division type divides resources equally amongst sessions. All the tasks of one session receive the same amount of resources as all the tasks of another. Using the previous example both sessions would receive equal amounts of resources, the query involving all the processing modules $110_{1 \ldots N}$ would divide ½ of the allocation group resources between 4 tasks, or ⅛ per task, and the query involving only one processing module $110_1$ would receive an undivided ½ of the resources for its single task. The first query could take 4 times longer to complete, each session received an equal portion of resources.

Figure 4:
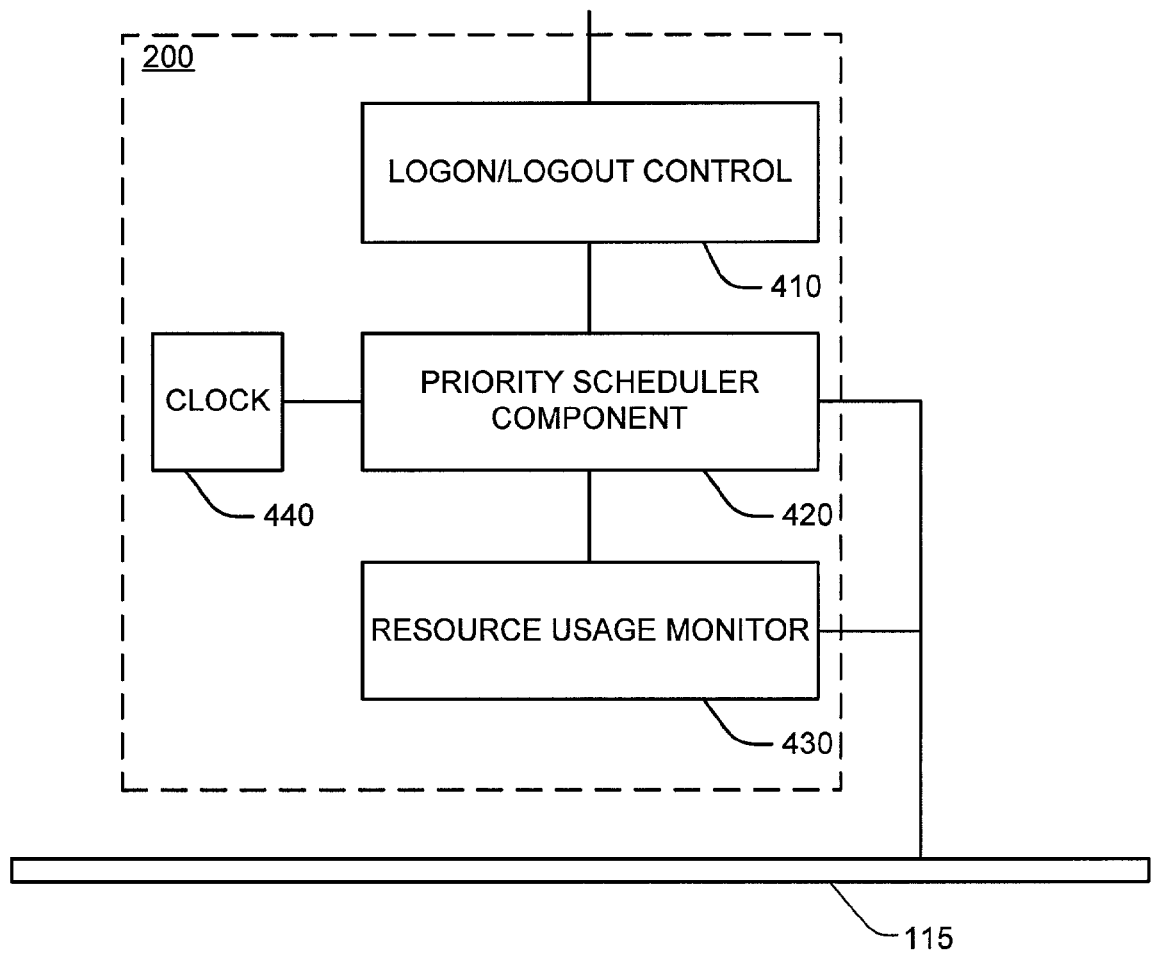
FIG. 4 is a block diagram of a session control.

FIG. 4 is a block diagram of the session control 200. The components of the session control can be implemented solely in software, solely in hardware, or in combination. One component is the logon/logout control 410, which determines whether a user can initiate a session. Once a session has been initiated, the priority scheduler component 420 determines the level of resources that will be used by tasks initiated by that session. The priority scheduler component 420 is coupled to a resource usage monitor 430 and a clock 440. Depending on the configuration of the performance groups, the priority scheduler component 420 can use information received from either or both to the resource usage monitor 430 and the clock 440 to determine the allocation group to which a task is assigned.

The resource usage monitor 430 can measure resource usage in a number of ways. For example, recent resource usage can be measured by the number of seconds out of the last 60 in which a task made use of a processor or I/O resource. Recent resource usage can also be measured by the current resource usage, in other words the most recent relative usage of processor and I/O resources.

In one implementation, the recent resource usage for each allocation group during a recent time period is known as the age period. The default time for this period is 60 seconds. This age period can be viewed as a sliding window of time, 60 seconds wide, through which the amount of resources consumed by a task or session can be viewed. If the tasks of an allocation group are consuming exactly their prescribed share of resources, say 13%, the recent resource consumption of the allocation group will be (60*0.13) or, 7.8 seconds. The recent resource consumption of each allocation group is updated periodically. Such a period can be at 2 second intervals or another interval can be specified. The update can be a percentage reduction combined with the addition of resources over the last two seconds. The update can also perform a full 60 second, or whatever period, reappraisal.

If a allocation group or resource partition does not consume resources for some specified period, they system can treat them as inactive and disregard them in determining relative weight. The specified period can be configurable. The resource usage monitor 430 and the priority scheduler component 420 are able to communicate with the network 115 to perform their respective functions.

Figure 5:
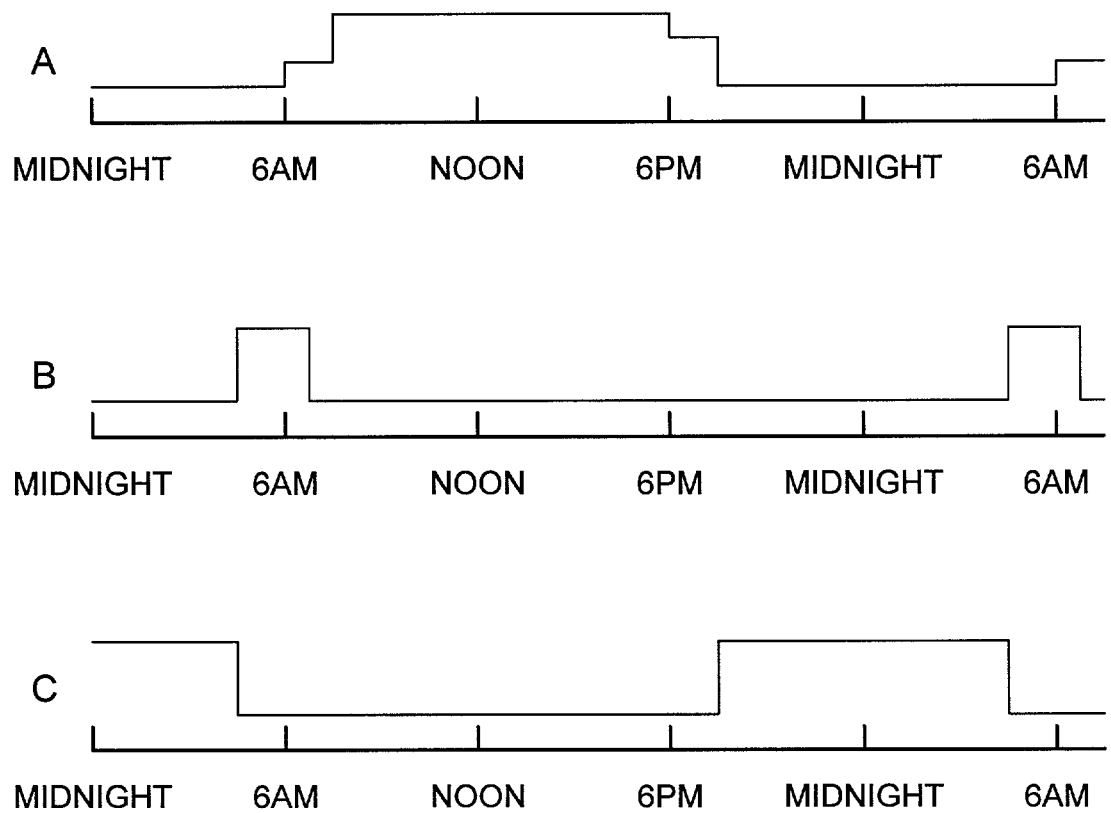
FIG. 5 illustrates example performance groups.

FIG. 5 illustrates example performance groups A, B, and C by charting allocation group weight against time. Each of the performance groups is divided into performance periods based on time of day. Performance group A assigns tasks to four different allocation groups. One allocation group has a low weight and applies to tasks at night. Two allocation groups with medium weight contains tasks in the early morning and early evening respectively. One allocation group with the highest weight contains tasks during the workday. Performance group A could be used for sessions that respond to customer inquiries so that those inquiries can be resolved quickly during the traditional workday.

Performance group B assigns tasks to two different allocation groups. One allocation group has a low weight and applies at all times other than the early morning. The other allocation group with a higher weight contains tasks running in the early morning. Performance group B could be used for sessions that prepare for the traditional workday so that results are ready before the day begins.

Performance group C assigns tasks to two different allocation groups. One allocation group has a low weight and contains tasks during the traditional work day including the early morning and evening. The other allocation group with a higher weight contains tasks running at night. Performance group C could be used for sessions running long-term projects so as not to interfere with day-to-day work. Many additional performance group definitions can be configured.

In one implementation, a resource partition's performance groups are ordered by assigning a unique relative priority value to each of them. This relative priority value defines an implicit performance level ordering among the groups with higher values equating to higher performance. For example, a value of 0 can be the lowest performance level and a value of 7 can be the highest. The order is known to the DBS 100 and can be used by it to specify the performance level of tasks invoked to perform certain work, by making performance group assignments based on their relative priority value. An example of performance groups in a resource partition is depicted in FIG. 6. Eight performance groups (PG) are shown 610, but only four allocation groups (AGs) are specified by the performance groups. The performance periods are defined by resource use, but because there is only one performance period per group, any amount of resource use will result in the same allocation group assignment. The weights of the allocation groups 620 are also shown in FIG. 6. Regardless of the time of day or recent resource use, a task initiated by a session that is assigned to the L performance group is scheduled for resources with a relative weight of 5/75. (Unless that task was assigned to a different performance group than the session that initiated it, which can happen under some implementations.) A task in the M performance group is treated identically as a task in the med$ performance group, even thought they have different priority values, 2 and 3.

If priority values are specified, it is not a strict requirement to define all eight, or however many there are, relative priority values within a resource partition. Scheduler default rules can provide that, if a performance group with a requested relative priority value is undefined, the performance group with the next higher defined relative priority value will be used. A resource partition comprised of just one performance group could be programmed and the scheduling strategy for that resource partition would be entirely determined by the parameters of that single performance group. The priority scheduler allows for multiple groups to be programmed, but does not require it.

In one implementation, the scheduler can also provide prioritized access to incoming work request messages. Arriving work requests, which carry their session's performance group assignment, are ordered in the input message queue by their performance group relative priority. The task that will be assigned to process a work request is then given a dispatch priority determined by the performance group's performance period and allocation group. The task is added to the OS scheduler dispatch queue and executed as soon as possible as determined by these assignments. Thus, a work request message for a session with high relative priority value will be promoted in the incoming message queue. Then, when a task is assigned to process the message it will be given a dispatch priority based on its allocation group weight and scheduling policy. The scheduler ensures that work requests are processed at their appropriate priority.

Figure 7:
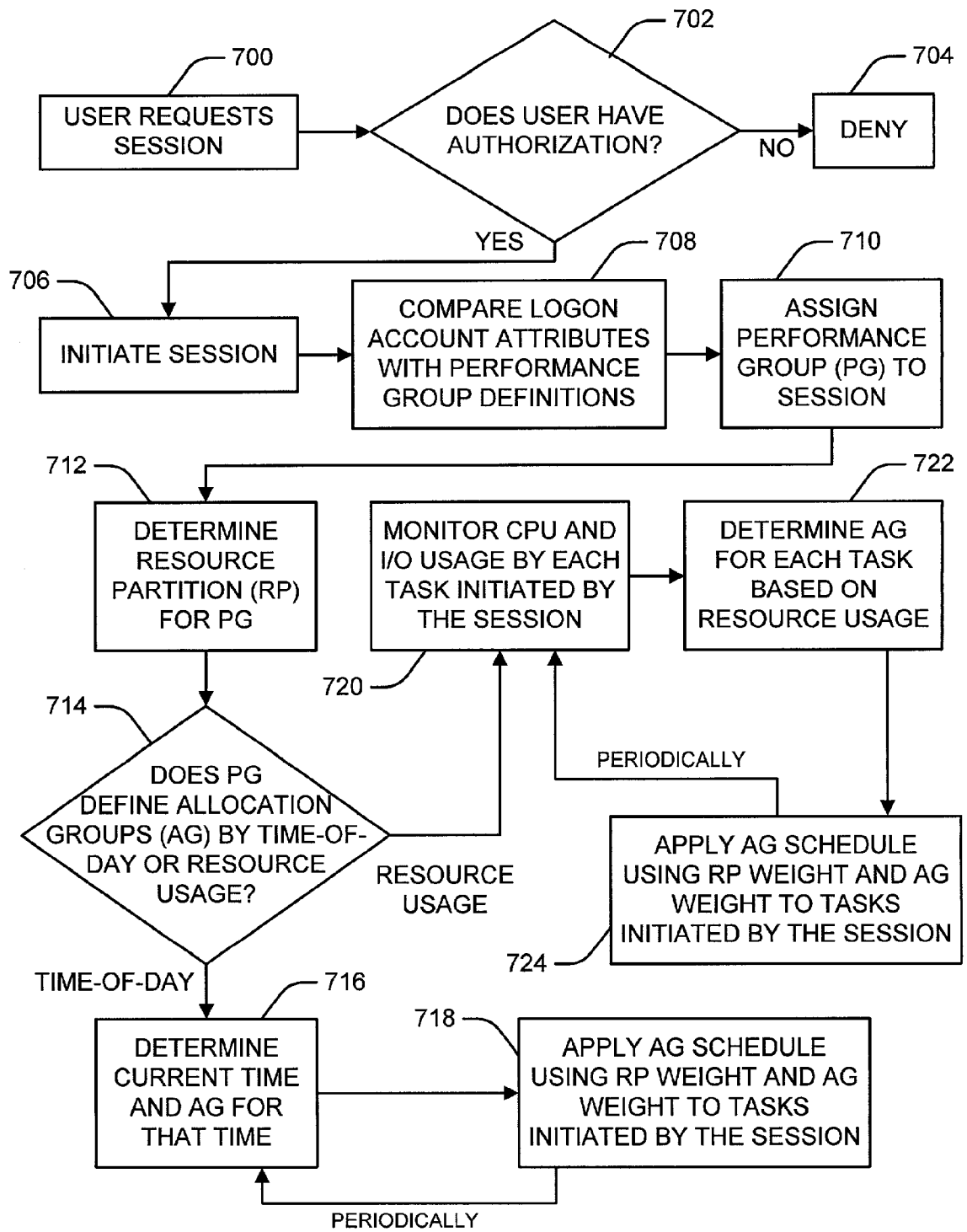
FIG. 7 is a flow chart of scheduling access to processor resources of a database.

FIG. 7 is a flowchart of a method of controlling resources allocated to tasks. When a user initially attempts to logon 700, the session control determines whether that user has permission to establish a session 702. If the user does not have permission, for example because the password is incorrect, the session is denied 704, possibly with a message saying why. If the user does have permission, the session is initiated 706. The priority scheduler component compares the session's logon account attributes with the performance group definitions 708. That step can involve merely checking if the name of the performance group is included in the accountid that initiated the session. Based on the comparison, the session is assigned to a performance group 710. By virtue of that assignment, the session is also part of the resource partition that contains the performance group 712. For more details see the discussion regarding FIG. 3.

In one implementation, a performance group contains performance periods that assign tasks to allocation groups by either time-of-day or resource usage 714. In other implementations, performance periods are based on other characteristics or a combination of characteristics. If tasks are assigned by the time-of-day, the current time and corresponding allocation group are determined 716. The schedule policy for the corresponding allocation group is applied to determine the resource allocation for session tasks together with the allocation group weight and the resource partition weight if the policy makes use of those values 718. The current time is periodically checked to determine whether the tasks will be assigned to a new allocation group.

If tasks are assigned by resource usage, the recent CPU and I/O usage by each task initiated by the session are monitored 720. Tasks are assigned to allocation groups based on recent resource usage 722. In another implementation, tasks are assigned to allocation groups based on recent resource usage of all tasks initiated by the session. The schedule policy for the assigned allocation group is applied to determine the resource allocation for session tasks together with the allocation group weight and the resource partition weight if the policy makes use of those values 724. The recent resource usage is periodically checked to determine whether the tasks will be assigned to a new allocation group.

The text above described one or more specific implementations of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

I claim:

1. A method for scheduling access to processor resources of a database, the method comprising the steps of:
    initiating one or more database sessions each in response to one or more user logons to the database;
    initiating a plurality of tasks in response to commands received from the one or more database sessions;
    classifying each of the plurality of tasks into one of a first set of groups based at least in part on one or more logon account attributes associated with the one of the one or more database sessions that initiated that task;
    assigning a weight to each group of the first set of groups;
    classifying each of the plurality of tasks into one of a second set of groups;
    assigning a weight to each group of the second set of groups;
    selecting a first task from the plurality of tasks; and
    limiting the first task's access to processor resources of the database based at least in part on the weight of a group from the first set of groups in which the first task is classified and also based at least in part on the weight of a group from the second set of groups in which the first task is classified.

2. The method of claim 1 where classifying each of the plurality of tasks into one of the second set of groups includes:
    classifying each of the one or more database sessions into one of a third set of groups based at least in part on one or more logon account attributes associated with that database session;
    assigning one or more time periods to each group of the third set of groups;
    assigning one group from the second set of groups to each of the time periods;
    determining the current time; and
    classifying each task in a group from the second set of groups corresponding to the time period assigned to a group from the third set of groups in which the database session that initiated that task is classified and that includes the current time.

3. The method of claim 1 where classifying each of the plurality of tasks in one of the first set of groups includes:
  classifying each of the one or more database sessions into one of a third set of groups based at least in part on one or more logon account attributes associated with that database session;
  associating each group in the third set of groups with one group of the first set of groups; and
  classifying each task in a group from the first set of groups that is associated with a group from the third set of groups in which the database session that initiated that task is classified.

4. The method of claim 1 where classifying each task in one of the second set of groups includes:
  classifying each of the one or more database sessions into one of a third set of groups based at least in part on one or more logon account attributes associated with that database session;
  assigning one or more resource usage ranges to each group of the third set of groups;
  for each of the one or more resource usage ranges, assigning a group from the second set of groups;
  determining a recent resource usage of each database session; and
  classifying each task in a group from the second set of groups corresponding to the resource usage range for a group from the third set of groups in which the database session that initiated that task is classified and that includes that database session's recent resource usage.

5. The method of claim 4 where the recent resource usage is a current resource usage.

6. The method of claim 4 where the recent resource usage is a
  measurement of processor and input/output usage during a preceding time period.

7. The method of claim 6 where the preceding time period is 60 seconds.

8. The method of claim 1 where the extent to which access is limited is recalculated periodically.

9. The method of claim 1 further comprising the step of:
  providing device driver access to the plurality of tasks in order of a priority based at least in part on the weight of the group from the first set of groups in which each task is classified and also based at least in part on the weight of the group from the second set of groups in which each task is classified.

10. A computer program, stored on a tangible storage medium, for scheduling access to processor resources of a database, the program comprising executable instructions that cause a computer to:
  initiate one or more database sessions each in response to one or more user logons to the database;
  initiate a plurality of tasks in response to commands received from the one or more database sessions;
  classify each of the plurality of tasks into one of a first set of groups;
  assign a weight to each group of the first set of groups;
  classify each of the plurality of tasks into one of a second set of groups;
  assign a weight to each group of the second set of groups;
  select a first task from the plurality of tasks; and
  limit the first task's access to processor resources of the database based at least in part on the weight of a group from the first set of groups in which the first task is classified and also based at least in part on the weight of a group from the second set of groups in which the first task is classified.

11. The computer program of claim 10 where the plurality of tasks are each classified into one of the first set of groups based at least in part on one or more logon account attributes associated with the database session that initiated that task.

12. The computer program of claim 10 where the executable instructions that cause a computer to classify each of the plurality of tasks into one of the second set of groups include executable instructions that cause a computer to:
  classify each database session into one of a third set of groups based at least in part on one or more logon account attributes associated with that database session;
  assign one or more time periods to each group of the third set of groups;
  for each time period, assign a group of the second set of groups;
  determine the current time; and
  classify each task in a group of the second set of groups corresponding to the time period for a group of the third set of groups in which the database session that initiated that task is classified and that includes the current time.

13. The computer program of claim 10 where the executable instructions that cause a computer to classify each of the plurality of tasks into one of the first set of groups include executable instructions that cause a computer to:
  classify each of the one or more database sessions into one of a third set of groups based at least in part on one or more logon account attributes associated with that database session;
  associate each group in the third set of groups with one group from the first set of groups; and
  classify each task in a group from the first set of groups that is associated with a group from the third set of groups in which the database session that initiated that task is classified.

14. The computer program of claim 10 where the executable instructions that cause a computer to classify each task in one of a second set of groups include executable instructions that cause a computer to:
  classify each of the one or more database sessions into one of a third set of groups based at least in part on one or more logon account attributes associated with that database session;
  assign one or more resource usage ranges to each group of the third set of groups;
  for each of the one or more resource usage ranges, assign a group from the second set of groups;
  determine a recent resource usage of each database session; and
  classify each task in a group of the second set of groups corresponding to the resource usage range for a group of the third set of groups in which the database session that initiated that task is classified and that includes that database session's recent resource usage.

15. The computer program of claim 14 where the recent resource usage is a current resource usage.

16. The computer program of claim 14 where the recent resource usage is a measurement of processor and input/output usage during a preceding time period.

17. The computer program of claim 16 where the preceding time period is 60 seconds.

18. The computer program of claim 10 where the extent to which access is limited is recalculated periodically.

19. The computer program of claim 10 where the executable instructions further cause a computer to:

provide device driver access to the plurality of tasks in order of a priority based at least in part on the weight of the group from the first set of groups in which each task is classified and also based at least in part on the weight of the group from the second set of groups in which each task is classified.

20. A scheduled resource access database system, comprising:

one or more nodes;

a plurality of data-storage facilities, each of the one or more nodes providing access to one or more of the data-storage facilities;

a plurality of CPUs, each of the one or more nodes providing access to one or more of the CPUs;

a plurality of virtual processes, each of the one or more CPUs providing access to one or more of the virtual processes;

each virtual process configured to manage data stored in one of the plurality of data-storage facilities;

a priority scheduler component configured to control access to the virtual processes by a plurality of sessions of the database system, the priority scheduler component configurable to classify tasks initiated by sessions in at least two different groups at the same time and limit access to the virtual processes by each task based at least in part on the at least two different groups in which that task in classified; and a resource usage monitor that is configurable to record recent resource usage by one of the plurality of sessions and where the priority scheduler component is configurable to classify a task initiated by the one of the plurality of sessions in a group based at least in part on that session's recent resource usage.

21. The database system of claim 20 further comprising a clock and where the priority scheduler component is configurable to classify a task initiated by a user into a group based at least in part on the time of day.

* * * * *